United States Patent
Kankar et al.

(10) Patent No.: US 7,908,143 B2
(45) Date of Patent: Mar. 15, 2011

(54) DIALOG CALL-FLOW OPTIMIZATION

(75) Inventors: Pankaj Kankar, New Delhi (IN); Mohit Kumar, New Delhi (IN); Amit Anil Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 10/834,672

(22) Filed: Apr. 28, 2004

(65) Prior Publication Data
US 2005/0243986 A1    Nov. 3, 2005

(51) Int. Cl.
*G10L 21/00* (2006.01)
*G10L 15/00* (2006.01)

(52) U.S. Cl. ......... 704/270; 704/231; 704/258; 704/275

(58) Field of Classification Search ............... 379/88.01, 379/88.04, 88.18, 88.22, 88.23, 917; 704/1, 704/9, 270, 275
See application file for complete search history.

(56) References Cited

U.S. PATENT DOCUMENTS

| | | | | |
|---|---|---|---|---|
| 4,682,365 A | * | 7/1987 | Orita et al. | 382/159 |
| 5,724,406 A | * | 3/1998 | Juster | 379/88.13 |
| 6,016,336 A | * | 1/2000 | Hanson | 379/88.23 |
| 6,119,087 A | * | 9/2000 | Kuhn et al. | 704/270 |
| 6,314,084 B1 | | 11/2001 | Kahale et al. | |
| 6,510,411 B1 | | 1/2003 | Norton et al. | |
| 6,597,705 B1 | | 7/2003 | Rezaiifar et al. | |
| 6,618,590 B1 | | 9/2003 | Howe | |
| 6,721,697 B1 | * | 4/2004 | Duan et al. | 704/9 |
| 6,823,054 B1 | * | 11/2004 | Suhm et al. | 379/134 |
| 7,130,391 B2 | * | 10/2006 | Janakiraman et al. | 379/88.17 |
| 2002/0075803 A1 | | 6/2002 | Zaharychuk et al. | |
| 2002/0123891 A1 | * | 9/2002 | Epstein | 704/235 |
| 2002/0193981 A1 | * | 12/2002 | Keung et al. | 704/1 |
| 2003/0046088 A1 | * | 3/2003 | Yuschik | 704/276 |
| 2003/0104813 A1 | | 6/2003 | Julka et al. | |
| 2003/0148779 A1 | | 8/2003 | Aravamudan et al. | |
| 2003/0157889 A1 | | 8/2003 | Yamada | |

(Continued)

FOREIGN PATENT DOCUMENTS
WO    WO 02/32090 A2    4/2002

OTHER PUBLICATIONS

Sinnig, D., "Patterns in Model-Based Development," 2003. Position Paper in INTERACT 2003, http://wwwswt.informatik.uni-rostock.de/deutsch/Interact/07SinnigForbrigSeffah.pdf.*

(Continued)

*Primary Examiner* — Richemond Dorvil
*Assistant Examiner* — Douglas C Godbold
(74) *Attorney, Agent, or Firm* — Gibb I.P. Law Firm, LLC; Derek S. Jennings (57) ABSTRACT

The present invention is concerned with reorganizing dialog call-flow in the presence of resource constraints. A call-flow has a set of dialogs. The set of grammars in a given call-flow set of dialogs is determined. Each grammar has an associated resource requirement. The resource constraint of the device is also determined. The dialogs are reorganized subject to the device resource constraints not being exceeded by a resultant resource requirement of merged dialogs. The grammars can be split into atomic dialogs before the reorganization is performed. The reorganization includes merging at least two of the dialogs.

18 Claims, 8 Drawing Sheets

U.S. PATENT DOCUMENTS

2003/0233230 A1* 12/2003 Ammicht et al. ............. 704/235
2004/0136517 A1* 7/2004 Bjornberg et al. ....... 379/220.01
2005/0041788 A1* 2/2005 Jan et al. .................... 379/88.18

OTHER PUBLICATIONS

Jameson, A., "Adapting to the user's time and working memory limitations: New directions of research," *ABIS-98*, FORWISS, Oct. 1988, Erlangen, Germany.

Minker, W., Haiber, U., Heisterkamp; P., Scheible, S., "Intelligent Dialog Overcomes Speech Technology Limitations: The SENECa Example," *International Conference on Intelligent User Interfaces*, Miami, Florida, Jan. 12-15, 2003, pp. 267-269.

Tiwari, V., Malik, S., and Wolfe, A.,"Power Analysis of Embedded Software: A First Step Towards Software Power Minimization," *IEEE Transactions on VLSI Systems*, vol. 2, No. 4, Dec. 1994.

Ong, P. W., Ynn, R. H., "Power-Conscious Software Design—a framework for modeling software on hardware," *IEEE Proc. of Symposium on Low Power Electronics*, pp. 36-37, 1994.

Barr, K. and Asanovic, K., "Energy Aware Lossless Data Compression," *Proceedings of MobiSys 2003: The First International Conference on Mobile Systems, Applications, and Services*, San Francisco, CA, USA, May 5-8, 2003.

Donovan, R. E., and Eide, E. M., "The IBM Trainable Speech Synthesis System", Int'l. Conf. On Spoken Lang. Processing, Sydney, 1998.

Levin, E., Pieraccini, R. and Eckert, W., "A Stochastic Model of Human-Machine Interaction for Learning Dialog Strategies", IEEE Transactions on Speech and Audio Processing, vol. 8, No. 1, Jan. 2000.

Padmanabhan, M., Saon, G., Zweig, G., Huang, J., Kingsbury, B. and Mangu, L., "Evolution of the performance of automatic speech recognition algorithms in transcribing conversational telephone speech" Instrumentation and Measurement Technology Conference, 2001. IMTC 2001. Proceedings of the 18$^{th}$ IEEE, vol. 3, May 21-23, 2001, pp. 1926-1931.

Peskin, B., Gillick, L., Liberman, N., Newman, M., van Mulbregt, P., and Wegmann, S., "Progress in recognizing conversational telephone speech", ICASSP-97, Apr. 21-24, 1997, pp. 1811-1814.

Ramaswamy, G.N. and Gopalakrishnan, P.S., "Compression of acoustic features for speech recognition in network environments", ICASSP98, vol. 2, pp. 977-980.

McTear, M.F., "Spoken Dialog Technology: Enabling the Conversational User Interface", ACM Computing Surveys, vol. 34, No. 1, Mar. 2002, pp. 90-169.

Jacob, R.J.K., Deligiannidis, L., Morrison, S., "A Software Model and Specification Language for Non-WIMP User Interfaces", 1999, ACM Digital Library.

Sensory Inc., "Product Brief—Fluent Speech Recognizer", (http://www.sensoryinc.com/html/support/docs/80-0216-A.pdf), Mar. 16, 2001.

Middelhoek, P.F.A., Rajan, S.P., "From VHDL to Efficient First-time-right Designs: a formal approach", *ACM Transactions on Design Automation of Electronic Systems*, vol. 1, 1996, pp. 205-220.

Kakita, K., "Inter-Speaker Interaction of F0 in Dialogs", *Proceedings of International Conference on Spoken Language Processing*, 1996.

Kemp, T., "Data-Driven Codebook Adaption in Phonetically Tied SCHMMS", *Proceedings of International Conference on Acoustics, Signal and Speech Processing*, 1995, vol. 1, pp. 477-479.

Mori, H., and Sakamura, K., Complexity Optimization Technique for Sound Synthesis on Digital Sound Processing Architectures, Proceedings of the Tenth TRON Project Symposium (Dec. 1993), IEEE Computer Society Press, pp. 113-125.

\* cited by examiner

DIALOG CALL-FLOW OPTIMIZATION

FIELD OF THE INVENTION

The present invention relates to automated conversational systems, and in particular to the optimization of call-flow dialog.

BACKGROUND

Dialog management systems are a key component in building conversational systems. The closest approach to a human-machine interface is a system that has very good speech recognition and a high level natural language understanding capability. However, due to the limited accuracy of any speech recognition system, known conversational systems must exploit the knowledge of a limited context to improve on recognition accuracy.

A typical conversational system is dialog based. The system asks a question to the user. Based on the user's response, a dialog management system moves in a particular order of further questions—the dialog call-flow—until it gains enough information from the user to perform the desired action. If a user has to go through a large number of questions to complete the call flow, the comfort factor of the system will be low. Therefore, any dialog management system has to balance keeping the number of questions small and asking sufficient questions to correctly determine the user's enquiry.

When such applications are to run on pervasive computing devices, the dialog management system has to additionally take into account the limited resources (including battery power and available memory). These factors will typically constrain the duration of a call-flow or the number of dialogs.

SUMMARY

The present invention is concerned with reorganizing dialog call-flow in the presence of resource constraints. A call-flow has a set of dialogs. The set of grammars in a given call-flow set of dialogs is determined. Each grammar has an associated resource requirement. The resource constraint of the device is also determined. The dialogs are reorganized subject to the device resource constraints not being exceeded by a resultant resource requirement of merged dialogs. The grammars can be split into atomic dialogs before the reorganization is performed. The reorganization includes merging at least two of the dialogs.

Dialogs can be represented as a tree structure of elements, and in that case are reorganized to merge one or more said elements to form at least one shorter path. Dialogs also can be represented as a tree structure of elements, and in that case are reorganized to merged one or more elements to shorten at least the longest path.

DETAILED DESCRIPTION

Definitions

A "call-flow" is a set of dialogs.

A "dialog" is a conversation between two parties. A dialog comprises of a <question, answer-grammar> pair. A "grammar" is a set of possible answers to a question. In a sequential call-flow, each question is independent of the answer to the previous question. In the case of a tree-type call-flow, a question may be dependent on the answer to the previous question.

A "merge" operation refers to a combination of at least two sub-dialogs to form a single dialog. This involves combining the grammars of the original sub-dialogs to generate a grammar that is used in the single dialog.

A "split" operation refers to generation of more than one sub-dialog from the initial dialog. This involves breaking the initial grammar into several smaller grammars which are used in the sub-dialogs.

Overview

Figure 1:
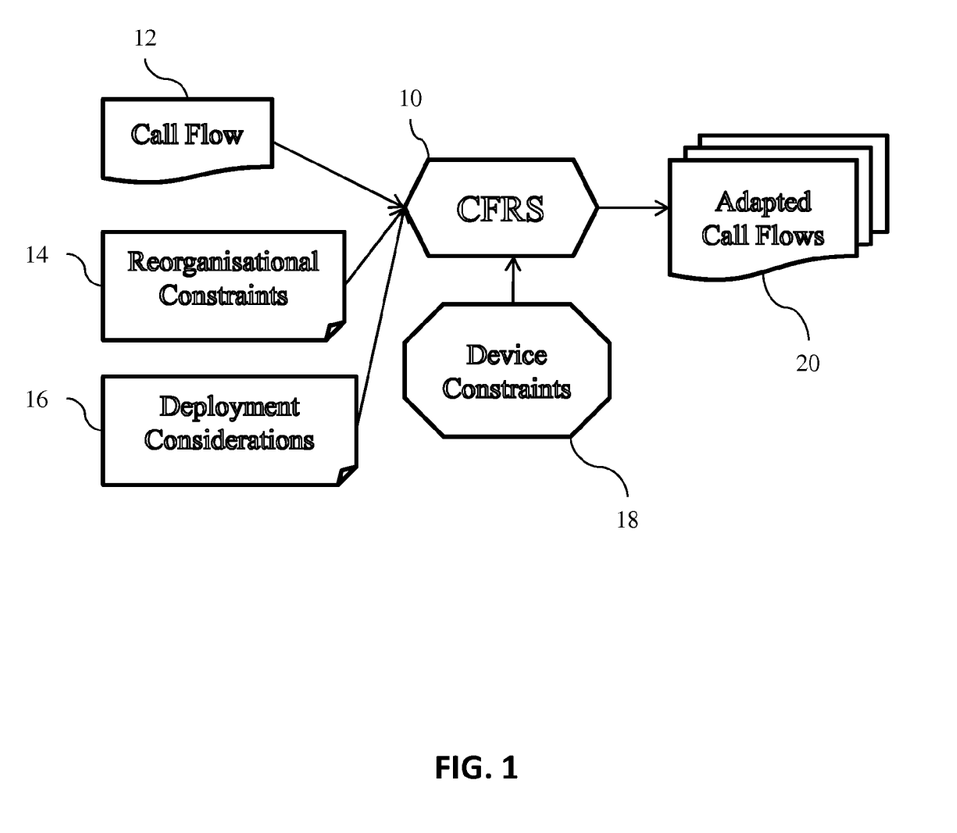
FIG. 1 is a flow diagram of the general process of dialog call-flow reorganization.

FIG. 1 is a flow diagram of the process of reorganizing call-flow dialog in view of constrained host device resources. The process is to be considered together with the system architecture shown in FIG. 2.

FIG. 1 shows a generalized Control-Flow Reorganization System (CFRS) 10, that operates on a dialog call-flow 12. The CRFS 10 also receives inputs relating to reorganizational constraints 14 (eg. 'Question A should always appear before Question B' OR 'Question A should never be merged with Question B' OR 'Question A should never be split'), deployment constraints 16 (eg. maximum number of questions askable), and host device constraints 18 (eg. memory capacity, battery power/energy capacity). The CFRS 10 performs a reorganization of a call-flow, taking the constraints into account, to generate one or more adapted call-flows 20.

Figure 2:
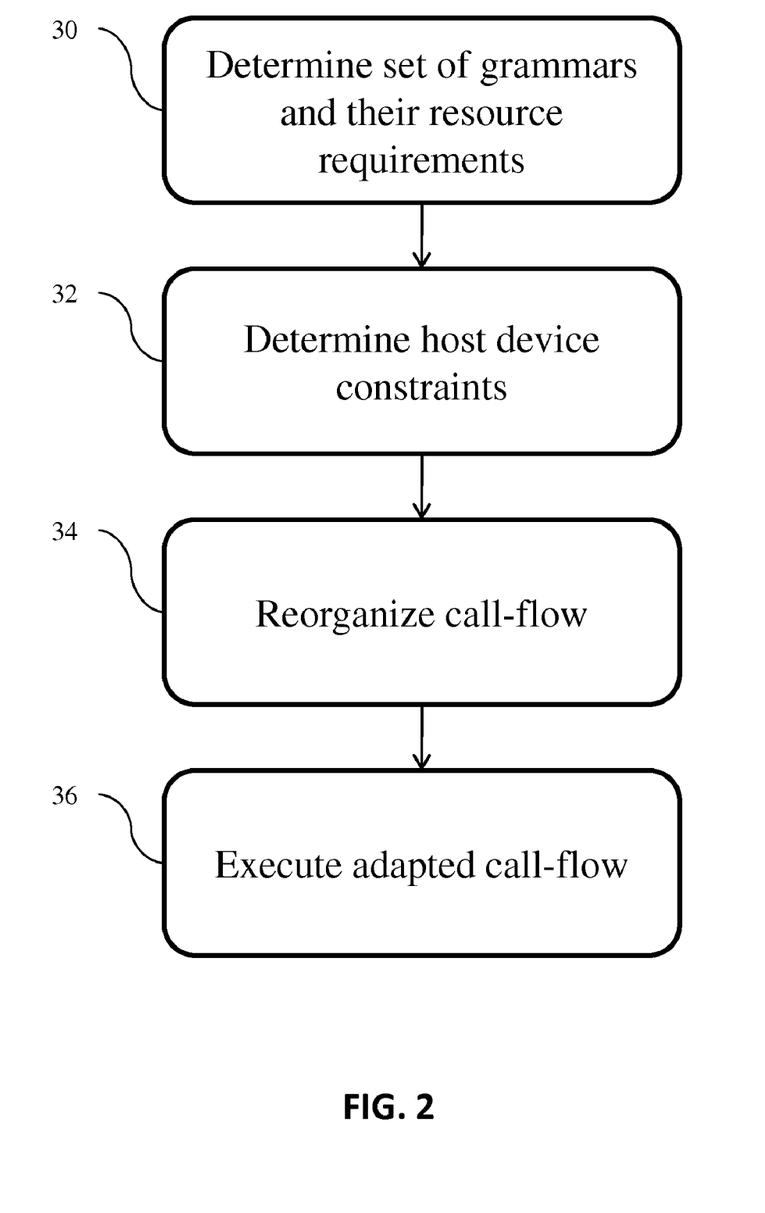
FIG. 2 is a schematic block diagram of a system architecture for the related to the process of FIG. 1.

The process flow performed by the CFRS 10, shown in FIG. 2 begins with the step of determining the set of grammars in a given call-flow, and what is the resource requirement for each grammar (step 30). A grammar resource requirement can be required memory space, for example. Next, the CFRS 10 determines the applicable constraints for the host device (step 32). This, most usually, will be memory capacity, in the sense that each grammar will require an amount of RAM to be executed. The devices supported can range from large-scale computing systems to small pervasive devices, such as mobile phones and PDAs, where memory capacity can be as low as 210 KB. The call-flow is then reorganized (step 34), but subject to limitations arising from the deployment considerations 16 and the host device constraints 14, as they may limit the grammar resource requirements. The reorganized call-flow then is available for execution (step 36). In that sense, the reorganization can be perform at compile time or run time.

Call-Flow Types

Call-flow applications can be divided into two types, sequential and tree-type. In a sequential call-flow, the next question asked is independent of the answer to the current question. An example is a purchase application that asks for the receiver's address then the receiver's credit card information. Each node in this type of call-flow acts as a input block. A tree-type call-flow is one where a user response determines the next question. Each question in this call-flow acts as a decision block, which results in a tree topology.

Different algorithmic approaches are taken, depending upon which form of modelling is adopted.

One approach—which is a form of preprocessing before reorganization of a call-flow is performed—is that of splitting the call-flow into atomic dialogs. One method for doing this is to use all internal non-terminals in a grammar and treat them as separate grammars.

Reorganization Algorithms—Resequence

Figure 3:
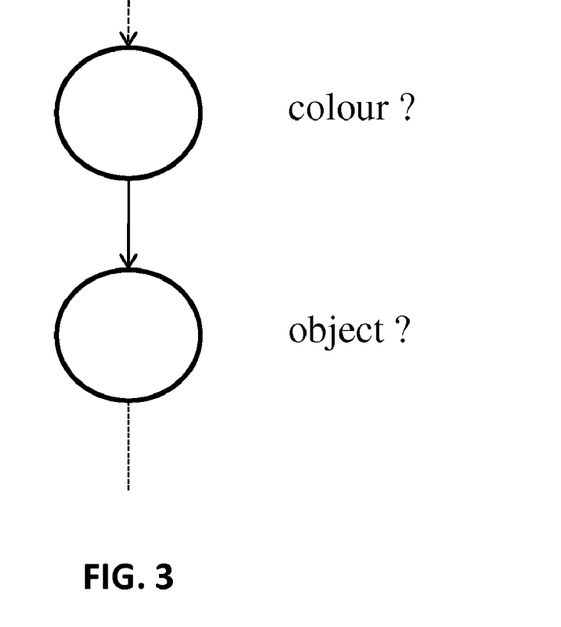
FIG. 3 is an example dialog call-flow.

We start with the observation that two grammars $g_1$ and $g_2$, comprising $|g_1|$ and $|g_2|$ elements respectively can be merged into a single grammar $g=g_1 \cdot g_2$ having $|g_1| \times |g_2|$ elements. FIG. 3 shows a simplified directed acyclic graph model of a call-flow. Here, there are two dialogs (questions): color? and object? The set $g_1$ is three choices: black, grey, white. The set $g_2$ has four choices: shirt, pant, shoes, tie. Since the dialogs are executed sequentially, the resource requirement is "3 units" then "4 units", the maximum obviously being "4 units".

Figure 4:
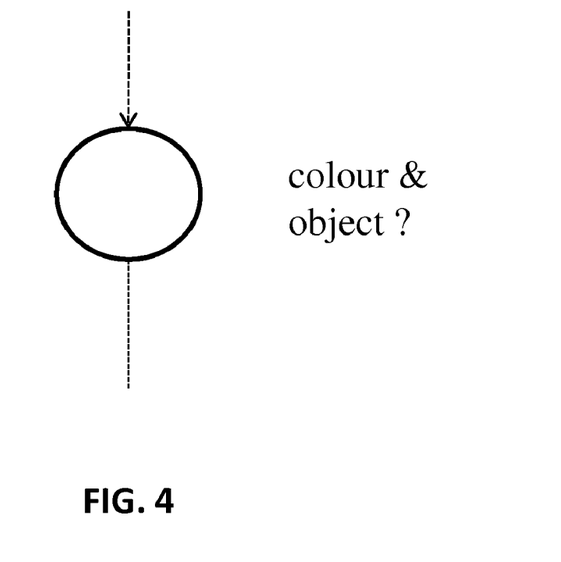
FIG. 4 shows the call-flow of FIG. 3 in a merged form.

FIG. 4 shows a merged form of the dialog, where there is now a single dialog g having membership of: black shirt, gray shirt, white shirt, black pant, gray pant, white pant, black shoes, gray shoes, white shoes, black tie, gray tie, white tie. The resource requirement is now "12 units", although the person answering the dialog may find it generally for convenient to answer only a single dialog.

This example represents a very simple call flow of only two dialogs, however it will seldom be the case where there is such simplicity. The reorganization of call-flows by merging will almost never achieve a single dialog, as device and deployment constraints will inevitably come into play.

A call-flow can be represented by a sequence $L=\{1, \ldots, n\}$ of atomic dialogs representing the order in which the dialogs are presented. An atomic dialog is one that cannot be split further. Any dialog can be converted to a sequence of atomic dialogs using the split operation. Thus it is assumed that there is a given call-flow represented by an atomic dialog sequence L. Given the atomic sequence, the goal is to merge as many questions as possible while respecting the memory constraint. The memory requirement $m(g_i)$ for each $g_i$ is known. A graph G is constructed as follows. The vertex set V(G) contains precisely the elements of L. For each vertex i in G, add edge (i, j) if $\Pi^j_{k=i} m(g_k) \leq M$ (i<j≤n), (i.e., the memory requirement of the merged grammars $g_i$ through $g_j$ can be accommodated within M). As a result of this, G becomes a directed acyclic graph. Note that G could be disconnected. Now, find the shortest path (or set of paths) from 1 to n, by finding the shortest path for each connected component of G. Each edge in the shortest path (set of paths) denote the subsequence of questions being merged.

Table 1 details the RESEQUENCE algorithm. $L_m$ denotes the output call-flow with the minimum number of dialogs. $L_m$ may contain merged (non-atomic) dialogs.

TABLE 1

1. input: sequential call-flow L.
2. output: sequential call-flow $L_m$ with the minimum number of questions.
3. Construct a graph G(V, E) as follows:
  (a) Represent all dialogs by vertices labelled $\{1, ,,,, n\}$
  (b) For each vertex i(1 ≤ i ≤ n)
    i. for each vertex j(i ≤ j ≤ n)
    ii. if $(\Pi^j_{x=i} m(g_x) \leq M)$, add (i, j) to G.

TABLE 1-continued

4. Find the shortest (set of) path(s) as follows:
  (a) start = 1. $L_m = \emptyset$.
  (b) while (start ≤ n)
    i. $L_m = L_m \cup \{start\}$.
    ii. Select $max_j$ such that (start, j) ∈ E.
    iii. Start = j + 1.
5. output $L_m$.

Figure 5:
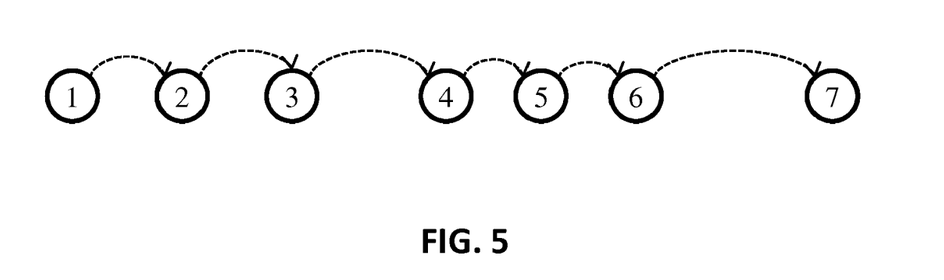
FIG. 5 shows a directed acyclic sequential graph of a call-flow.
Figure 6A:
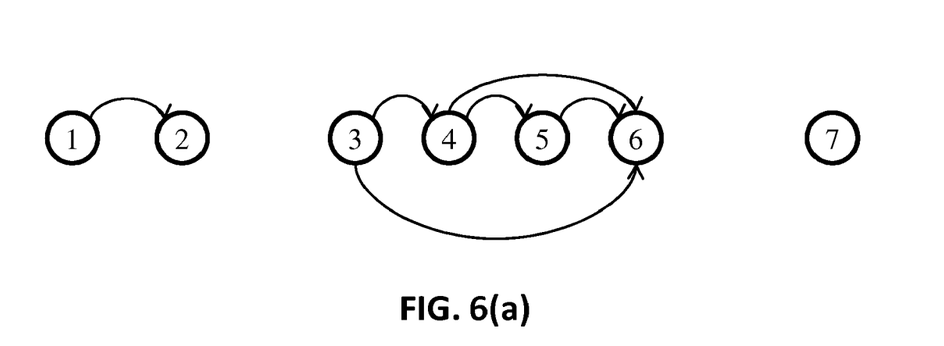
FIG. 6(a) shows all the possible merges on the call-flow of FIG. 5.
Figure 6B:
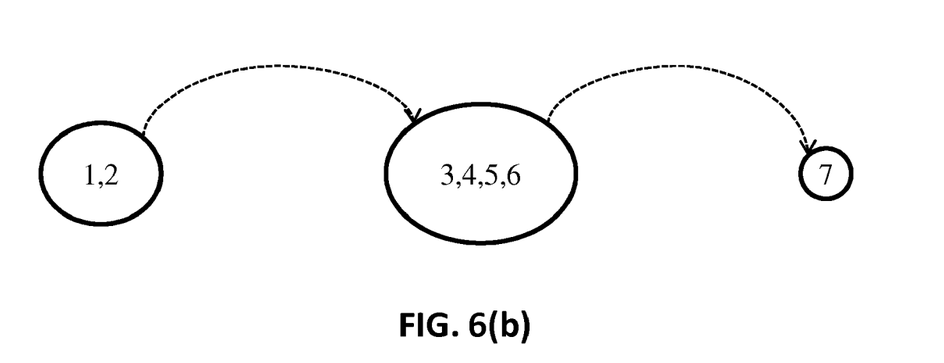
FIG. 6(b) shows the reorganized call-flow of FIG. 5 after applying the Resequence algorithm on FIG. 6(a).

FIG. 5 shows an input sequential call-flow. It has 7 sub-dialogs and the arrows specify the sequence of the call-flow. FIG. 6(a), shows all the possible merges that can be performed upon the call-flow, given a set of reorganization constraints. For example, it is a reorganization constraint not to merge sub-dialog 2 with sub-dialog 3, and similarly the case with sub-dialogs 6 and 7. FIG. 6(b) shows the call-flow of FIG. 5 in adapted form as a result of the RESEQUENCE algorithm. In this call-flow, the sub-dialogs 1 and 2 are merged into a single sub-dialog. It is similarly the case with sub-dialogs 3, 4, 5 and 6.

Reorganization Algorithms—Balancetree

Two grammars $g_1$ and $g_2$ comprising of $|g_1|$ and $|g_2|$ elements respectively can be merged into a single grammar $g=g_1+g_2$ having $|g_1|+|g_2|$ elements.

Figure 7:
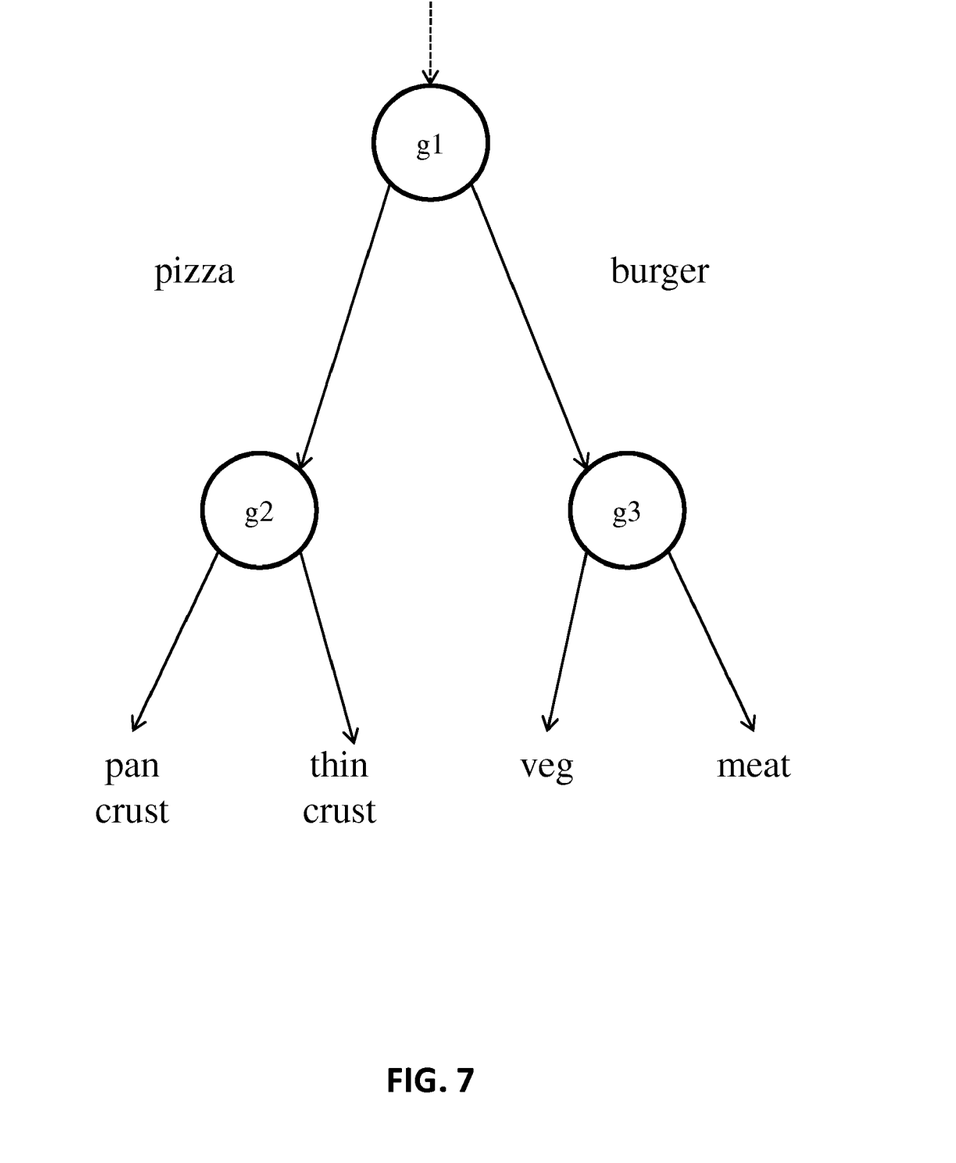
FIG. 7 shows a tree-type call-flow.

FIG. 7 shows a simple example of a tree-type call-flow, where the grammars are:
  $g_1$=pizza OR burger (2 choices)
  $g_2$=pan crust OR thin crust (2 choices)
  $g_3$ vegetarian OR meat (2 choices)

Figure 8:
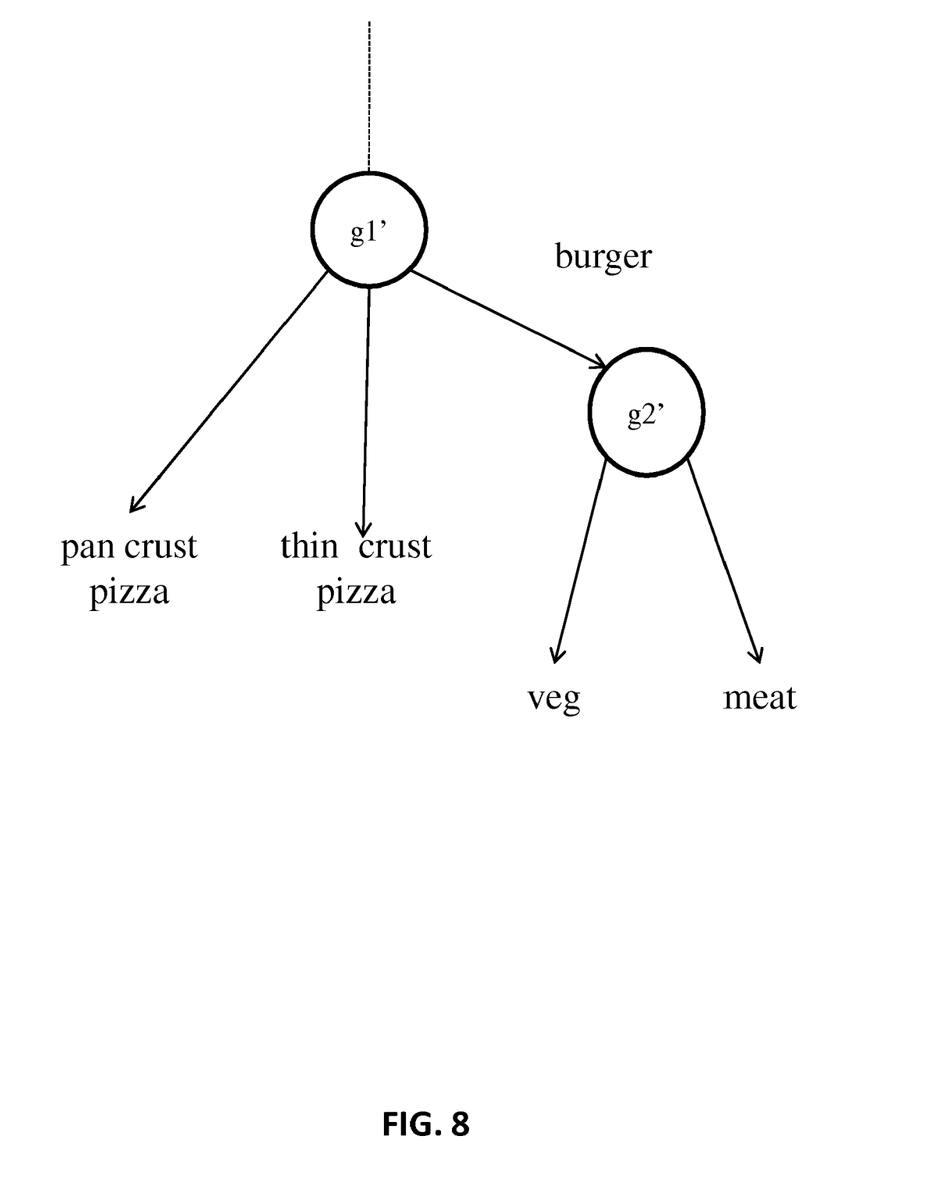
FIG. 8 shows the call-flow of FIG. 7 in adapted form.

FIG. 8 shows the call-flow of FIG. 7 in adapted form, where the grammars have become:
  $g'_1$=pan crust pizza OR thin crust pizza OR burger (3 choices)
  $g'_2$=vegetarian OR meat (2 choices)

The dialog has been reduced to two questions.

The reorganization of the call-flow is performed algorithmically. It is useful to firstly introduce a few concepts, however.

Definition 1. The degree of a vertex is the number of its children.

Definition 2. A 2-subtree of a vertex v is a tree of depth 2 with v as the root.

Definition 3: A 2-subtree of a vertex v is balanced if all the leaves of the 2-subtree are at distance 2 from v, i.e., no child of v is childless. A 2-subtree of a vertex v is 1-balanced if at least one child of v is childless. A 2-subtree is either balanced or 1-balanced.

Definition 4. Let the maximum degree of any vertex in a call-flow tree be denoted by Δ. The vacancy of a vertex v is defined as Δ−degree(v).

Definition 5. The fold operation is defined on the root v of a 2-subtree and allows v to directly inherit all its grandchildren if the vacancy(v)≥$\Sigma_i$ degree(child$_i$(v)). As a result of this operation, all the grandchildren of v become its own children, and the original children are removed. This operation reduces the height of the tree by 1.

A bottom-up approach on the longest paths in a tree—one 2-subtree at a time—provides a solution. This is the essence of the BALANCETREE algorithm. At each step, the longest path is found, its height reduced by 1, if a fold operation is possible at any vertex from the grandparent of the leaf in the longest path to the root. Shorten traverses up the tree till it is able to reduce the height by 1. After this reduction, the longest path is calculated again and the same procedure is applied. If at any time, the longest path cannot be reduced, the algorithm terminates. Since the longest path is found globally at each step, and since the height of the tree is reduced only 1 at a time, maximal height reduction is obtained.

The algorithmic expression is given in Table 2.

TABLE 2

1. input: tree-type call-flow T.
2. output: tree-type call-flow $T_m$ with the minimum number of questions.
3. initialise $T_m$ = T; boolean changed = false.
4. do
   (a) Find the longest path in $T_m$ and identify its 2-subtree $t_2$.
   (b) if (shorten ($T_m$, $t_2$)) changed = true.
5. while (changed)
6. output $T_m$.
7. shorten ($T_m$, $t_2$)
   (a) while ($t_2 \neq$ "root")
   (b) do
      i. if (fold($t_2$)) return true.
      ii. Else $t_2$ = parent($t_2$).
   (c) done
   (d) return false.
8. fold($t_2$)
   (a) if ((vacancy($t_2$) $\geq$ degree(children ($t_2$))) return true.
   (b) return false.

Specific Example

The specific example given is a flight information call-flow based on voice recognition operating on a hand-held user device, such as a mobile phone.

The voice application corresponding to an atomic flight information call-flow is shown in Table 3. The call-flow is implemented in VXML, a common markup language to author conversational applications. The applications shown in Table 3 is a sequential dialog call-flow. It requires 6 fields (airline, airport, flight number, credit card type, departure city and state) to be provided by the customer. Six different grammars are required corresponding to the six questions in the call-flow. Similarly, Table 4 shows another VXML representation of the same application. However, this requires only one grammar corresponding to the one question in the application. This grammar has been generated by merging the six grammars of application in Table 3. Thus the two applications in Tables 3 and 4 represent the two extremes of dialog call-flows.

The call-flow in Table 3 comprises of atomic grammars only and thus forms an input to RESEQUENCE.

TABLE 3

```
<?xml version = 1.0?>
<vxml version = 1.0>
<formid = flight_info>
  <block>
    <prompt>
      Welcome to the flight information Portal.
    </prompt>
  </block>
  <fieldname = "usState">
    <grammar src = usState.jsgf type = application/x-jsgf/>
    <prompt>
      Tell me your departure state.
    </prompt>
  </field>
  <fieldname = "usCity">
    <grammarsrc = usCity.jsgftype = application/x-jsgf/>
    <prompt>
      What is your departure city?
    </prompt>
  </field>
  <fieldname = "airport">
    <grammarsrc = airport.jsgftype = application/x-jsgf/>
    <prompt>
      Which airport would you want to fly from.
    </prompt>
```

TABLE 3-continued

```
    </prompt>
  </field>
  <fieldname = "airline">
    <grammarsrc = airline.jsgftypt = application/x-jsgf/>
    <prompt>
      Which airline would you want to fly?
    </prompt>
  </field>
  <fieldname = "cctype">
    <grammarsrc = cctype.jsgftype = application/x-jsgf/>
    <prompt>
      What type is your credit card?
    </prompt>
  </field>
  <field name = "ccnumber">
    <grammarsrc = ccnumber.jsgftype = application/x-jsgf/>
    <prompt>
      Please tell me your credit card number.
    </prompt>
  </field>
  <filled>
    <prompt>
      Thank you for using the Flight information application.
    </prompt>
  </filled>
</form>
</vxml>
```

The memory sizes of each grammar is shown in Table 4, and refers to the memory m required by a device to perform speech recognition using grammar g.

TABLE 4

```
<?xml version = 1.0?>
<vxml version = 1.0>
<form id = flight_info>
  <block>
    <prompt>
      Welcome to the flight information Portal.
    </prompt>
  </block>
  <field name = "flightInfo">
    <grammar src = flightInfo.jsgf type = application/x-jsgf/>
    <prompt>
      Tell me your departure city, state, airport,
      airline, credit card type and credit card number.
    </prompt>
  </field>
  <filled>
    <prompt>
      Thank you for using the Flight information application.
    </prompt>
  </filled>
</form>
</vxml>
```

These figures were estimated based on the information in a product brief of the Fluent Speech™ software of Sensory Inc., of 1991 Russell Avenue, Santa Clara, Calif. 95054-2035, numbered 80-193-0 "Product Brief—Fluent Speech Recognizer" of Mar. 16, 2001, which specifies the memory requirements for a given vocabulary. The specification mentions that an extra 250 bytes of memory is required for each additional word.

Figure 9:
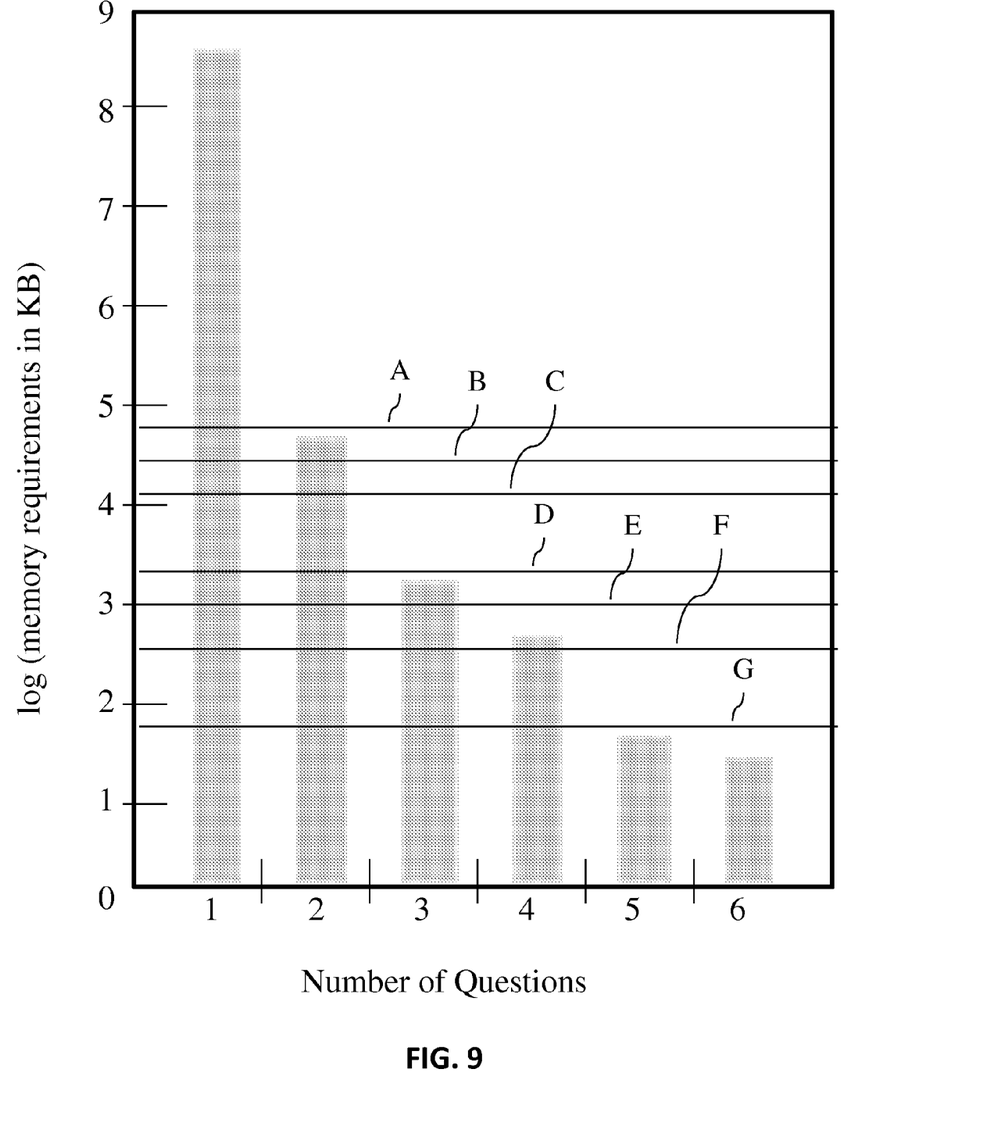
FIG. 9 shows a graph of data for a call-flow in terms of no. questions versus memory requirements.

The <m, q> characteristics of the above call-flow is shown in FIG. 9. The x-axis of this bar chart reflects to the number of questions in the dialog call-flow and the y-axis shows the memory that would be required to execute the particular call-flow. Each bar in the chart corresponds to a unique call-flow. The value on the y-axis refers to the memory required to execute the largest grammar in the respective call-flow. The plot has been generated by running the RESEQUENCE algorithm on the call-flow mentioned in Table 3 by varying m and finding the corresponding q values. For running the call-flow in Table 3, a device needs at least as large a memory as the largest grammar, namely, the Airport grammar.

From the <m, q>—characteristics, we can decide which call-flow should be used for a particular device. Consider the following mobile devices given in Table 5.

TABLE 5

| Index | Device | Memory Capacity |
|---|---|---|
| A | Compaq Ipaq H3970 | 64 MB |
| B | Mitac Mio 338 | 40 MB |
| C | Sony Clie PEG-NX70V | 16 MB |
| D | Nokia 6600 | 3 MB |
| E | Nokia 7650 | 1.4 MB |
| F | Nokia 6585 | 512 KB |
| G | Nokia 3100 | 210 KB |

For this particular example, given the devices specified in Table 5, it is concluded that the feasible dialog call-flow for Nokia 3100 and Nokia 6585 is the one that would be represented by bar 5 in the chart. For Nokia 6600 and Sony Clie PEG-NX70V the call-flow corresponding to the bar 3 would be optimal.

Computer Hardware

Figure 10:
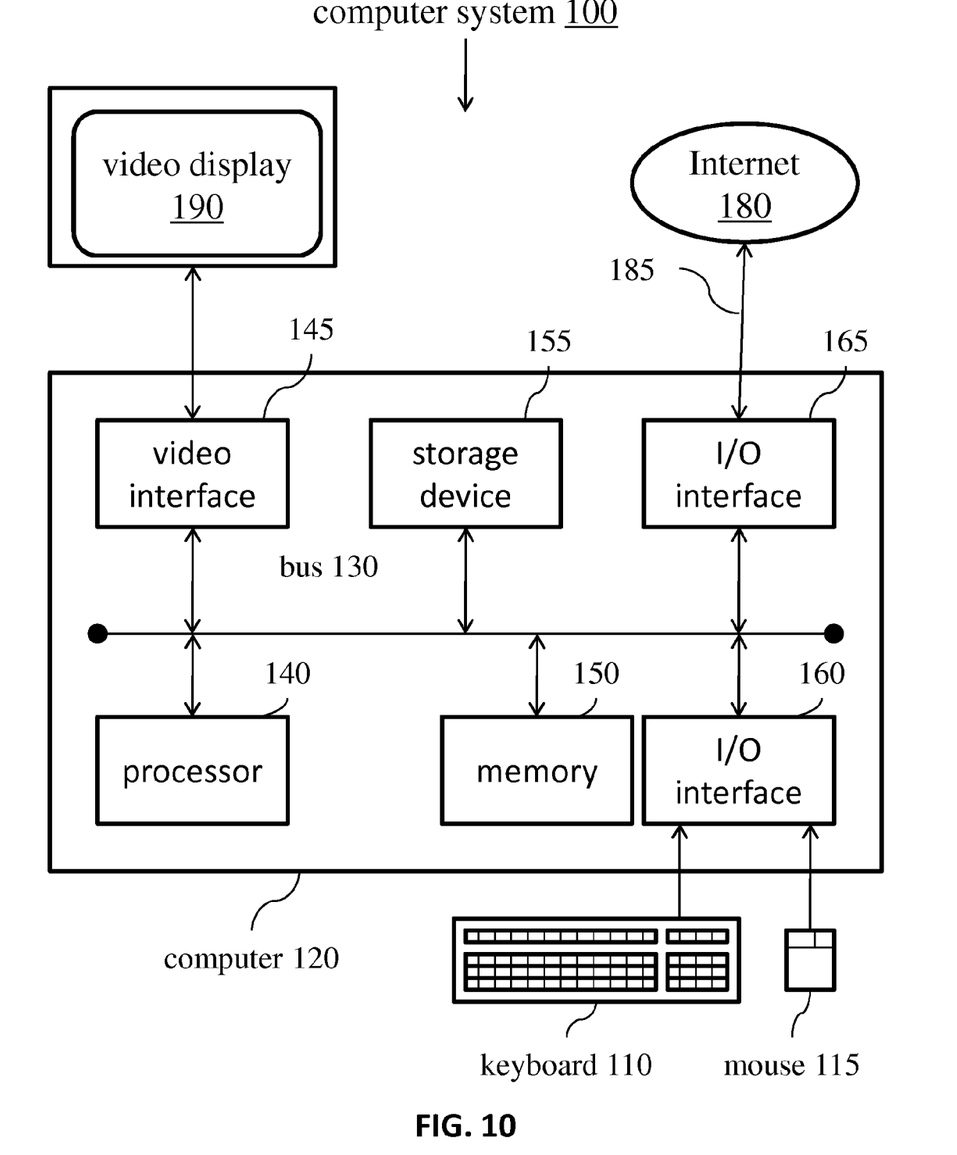
FIG. 10 is a schematic representation of a computer system suitable for performing the techniques described herein.

FIG. 10 is a schematic representation of a computer system of a type that is suitable for executing computer software for reorganizing the dialog call-flow algorithms referred to in the Tables given above. Computer software executes under a suitable operating system installed on the computer system, and may be thought of as comprising various software code means for achieving particular steps.

The components of the computer system include a computer, a keyboard and mouse, and a video display. The computer includes a processor, a memory, input/output (I/O) interfaces, a video interface, and a storage device.

The processor is a central processing unit (CPU) that executes the operating system and the computer software executing under the operating system. The memory includes random access memory (RAM) and read-only memory (ROM), and is used under direction of the processor.

The video interface is connected to video display and provides video signals for display on the video display. User input to operate the computer is provided from the keyboard and mouse. The storage device can include a disk drive or any other suitable storage medium.

Each of the components of the computer is connected to an internal bus that includes data, address, and control buses, to allow components of the computer to communicate with each other via the bus.

The computer system can be connected to one or more other similar computers via a input/output (I/O) interface using a communication channel to a network, represented as the Internet.

The computer software may be recorded on a portable storage medium, in which case, the computer software program is accessed by the computer system from the storage device. Alternatively, the computer software can be accessed directly from the Internet by the computer. In either case, a user can interact with the computer system using the keyboard and mouse to operate the programmed computer software executing on the computer.

Other configurations or types of computer systems can be equally well used to execute computer software that assists in implementing the techniques described herein.

Conclusion

Various alterations and modifications can be made to the techniques and arrangements described herein, as would be apparent to one skilled in the relevant art.

We claim:

1. A computer-implemented method for an automated conversational system, said method comprising:
   providing an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow;
   using a computing host device, splitting said initial dialog call-flow and said initial grammar into a set of sub-dialogs and a corresponding set of grammars;
   using said computing host device, determining a resource requirement for each grammar of said set of grammars;
   using said computing host device, determining a resource constraint of said computing host device; and
   using said computing host device, reorganizing said set of sub-dialogs subject to said resource constraint of said computing host device not being exceeded by a resultant resource requirement resulting from merging at least two sub-dialogs into a single dialog, and
   wherein said set of sub-dialogs are represented as a tree structure of elements, and said reorganizing comprises merging at least one of said elements to form at least one shorter path of said tree structure.

2. The method of claim 1, wherein said set of sub-dialogs are represented as a tree structure of elements, and said reorganizing comprises merging at least one of said elements to shorten at least a longest path of said tree structure.

3. The method of claim 1, further comprising determining a set of reorganizational constraints, wherein said reorganizing merges said at least two sub-dialogs only if said set of reorganizational constraints are not violated by said merging said at least two sub-dialogs.

4. The method of claim 3, wherein said set of reorganizational constraints include allowable dialog merges.

5. The method of claim 1, further comprising determining a set of deployment constraints, wherein said reorganizing merges said at least two sub-dialogs while said set of deployment constraints are satisfied.

6. The method of claim 5, wherein said set of deployment constraints include a maximum number of sub-dialogs.

7. The method of claim 1, wherein said resource constraint of said computing host device includes available memory space.

8. A computer-implemented method for an automated conversational system, said method comprising:
   providing an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow;
   using a computing host device, splitting said initial dialog call-flow and said initial grammar into a set of atomic dialogs and a corresponding set of grammars, where said atomic dialogs comprise dialogs that cannot be split any further;

using said computing host device, determining a resource requirement for each grammar of said set of grammars;

using said computing host device, determining a resource constraint of computing host device; and using said computing host device, reorganizing said set of atomic dialogs subject to said resource constraint of said computing host device not being exceeded by a resultant resource requirement resulting from merging at least two atomic dialogs, and wherein said set of atomic dialogs are represented as a tree structure of elements, and said reorganizing comprises merging one or more of said elements to form at least one shorter path of said tree structure.

9. The method of claim 8, wherein said splitting is performed by treating all internal non-terminal grammars as separate grammars.

10. The method of claim 8, wherein said set of atomic dialogs are represented as a tree structure of elements, and said reorganizing comprises merging one or more of said elements to shorten at least a longest path of said tree structure.

11. The method of claim 8, further comprising determining a set of reorganizational constraints, wherein said reorganizing merges said at least two atomic dialogs if said set of reorganizational constraints are not violated by said merging said at least two atomic dialogs.

12. The method of claim 11, wherein said set of reorganizational constraints include allowable dialog merges.

13. The method of claim 8, further comprising determining a set of deployment constraints, wherein said reorganizing merges said at least two atomic dialogs while said set of deployment constraints are satisfied.

14. The method of claim 8, wherein said resource constraint of said computing host device includes available memory space.

15. A computer host device for an automated conversational system, said host device comprising:

an input receiving an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow; and a processor splitting said initial dialog call-flow and said initial grammar into a set of sub-dialogs and a corresponding set of grammars; determining a resource requirement for each grammar of said set of grammars; determining a resource constraint of said computing host device; and reorganizing said set of sub-dialogs subject to said resource constraint of said computing host device not being exceeded by a resultant resource requirement resulting from merging at least two sub-dialogs into a single dialog, wherein said set of sub-dialogs are represented as a tree structure of elements, and said reorganizing comprises merging at least one of said elements to form at least one shorter path of said tree structure.

16. A computer host device for an automated conversational system, said host device comprising:

an input receiving an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow; and a processor splitting said initial dialog call-flow and said initial grammar into a set of atomic dialogs and a corresponding set of grammars, where said atomic dialogs comprise dialogs that cannot be split any further; determining a resource requirement for each grammar of said set of grammars; determining a resource constraint of said computing host device; and reorganizing said set of atomic dialogs subject to said resource constraint of said computing host device not being exceeded by a resultant resource requirement of resulting from merging at least two atomic dialogs, wherein said set of atomic dialogs are represented as a tree structure of elements, and said reorganizing comprises merging one or more of said elements to form at least one shorter path of said tree structure.

17. A non-transitory program storage device readable by computer comprising a program, of instructions executable by said computer to perform a method for optimization in an automated conversational system, the method comprising:

providing an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow;

performing the following at a computing host device:

splitting said initial dialog call-flow and said initial grammar into a set of sub-dialogs and a corresponding set of grammars;

determining a resource requirement for each grammar of said set of grammars;

determining a resource constraint of said computing host device; and reorganizing said set of sub-dialogs subject to said resource constraint of said computing host device not being exceeded by a resultant resource requirement resulting from merging at least two sub-dialogs into a single dialog, and wherein said set of sub-dialogs are represented as a tree structure of elements, and said reorganizing comprises merging at least one of said elements to form at least one shorter path of said tree structure.

18. A non-transitory program storage device readable by computer comprising a program of instructions executable by said computer to perform a method an automated conversational system, the method comprising:

providing an initial dialog call-flow corresponding to an initial grammar, where said dialog call-flow includes a set of dialogs each including a <question, grammar> pair, where said grammar includes a set of possible answers to said corresponding question, and where said call-flow comprises a tree-type call flow where questions are dependent on answers to previous questions in the dialog call flow;

performing the following at a computing host device:

splitting said initial dialog call-flow and said initial grammar into a set of atomic dialogs and a corresponding set of grammars, where said atomic dialogs comprise dialogs that cannot be split any further;

determining a resource requirement for each grammar of said set of grammars;

determining a resource constraint of said computing host device; and reorganizing said set of atomic dialogs subject to said resource constraint of said computing host device not being exceeded by a resultant resource requirement resulting from merging at least two atomic dialogs, and wherein said set of atomic dialogs are represented as a tree structure of elements, and said reorganizing comprises merging one or more of said elements to form at least one shorter path of said tree structure.

* * * * *